US011648690B2

(12) United States Patent
Brown

(10) Patent No.: US 11,648,690 B2
(45) Date of Patent: May 16, 2023

(54) ROBOTIC END-OF-ARM TOOLS AND METHODS OF USE

(71) Applicant: House of Design LLC, Nampa, ID (US)

(72) Inventor: Christopher T. Brown, Nampa, ID (US)

(73) Assignee: House of Design LLC, Nampa, ID (US)

( * ) Notice: Subject to any disclaimer, the term of this patent is extended or adjusted under 35 U.S.C. 154(b) by 329 days.

(21) Appl. No.: 16/999,544

(22) Filed: Aug. 21, 2020

(65) Prior Publication Data
US 2022/0055230 A1    Feb. 24, 2022

(51) Int. Cl.
*B25J 15/02* (2006.01)
*B25J 9/12* (2006.01)
*B25J 15/00* (2006.01)

(52) U.S. Cl.
CPC ........... *B25J 15/0266* (2013.01); *B25J 9/123* (2013.01); *B25J 15/0033* (2013.01)

(58) Field of Classification Search
CPC .... B25J 9/123; B25J 15/0033; B25J 15/0253; B25J 15/0266
See application file for complete search history.

(56) References Cited

U.S. PATENT DOCUMENTS

| | | | | |
|---|---|---|---|---|
| 3,236,274 | A | * | 2/1966 | Eynon ..................... B27B 31/00 144/4.1 |
| 3,312,496 | A | * | 4/1967 | Boutelle .............. B25J 17/0241 294/115 |
| 3,370,213 | A | * | 2/1968 | Rose ........................ H02P 29/40 318/513 |
| 4,728,137 | A | * | 3/1988 | Hamed ................ B25J 15/0266 294/115 |
| 5,364,147 | A | | 11/1994 | Dickey et al. |
| 5,588,688 | A | * | 12/1996 | Jacobsen .............. B25J 15/0266 294/902 |
| 2003/0135984 | A1 | | 7/2003 | Nayar et al. |
| 2010/0078953 | A1 | | 4/2010 | Ban et al. |
| 2012/0175904 | A1 | * | 7/2012 | Murakami ............... B25J 15/08 294/213 |
| 2014/0265401 | A1 | | 9/2014 | Allen Demers et al. |
| 2021/0053215 | A1 | * | 2/2021 | Kim ....................... B25J 9/1687 |

OTHER PUBLICATIONS

International Search Report and Written Opinion dated Dec. 23, 2021 for PCT/US2021/047012.

* cited by examiner

*Primary Examiner* — Saul Rodriguez
*Assistant Examiner* — Brendan P Tighe
(74) *Attorney, Agent, or Firm* — Foley & Lardner LLP

(57) ABSTRACT

End-of-arm tools to be coupled to a robotic arm and configured to handle structural lumber objects are disclosed as are methods of use for such. The end-of-arm tools comprise opposing jaws to grip the lumber objects. The opposing jaws are coupled to a rigid frame via a four-bar linkage providing mechanical advantage and over-center functionality. An actuated extractor extends between the opposing jaws to engage the lumber object upon release. Assemblies of multiple end-of-arm tools coupled together are also disclosed.

20 Claims, 13 Drawing Sheets

ROBOTIC END-OF-ARM TOOLS AND METHODS OF USE

TECHNICAL FIELD

The present disclosure relates generally to the field of robotics and specifically end-of-arm tools for attachment to and use with a robotic arm. The present disclosure further relates to end-of-arm tools related to handling of lumber objects such as structural components for building construction.

BACKGROUND

Applying robotics to the pre-fabrication of structural components, such as trusses, can save significant time and labor, which can thereby improve efficiency and expedite completion of a construction project. Automated pre-fabrication of structural components is presently limited because of challenges in manipulating the structural components and placing them in an appropriate position for assembly.

As lumber is a fibrous material and, in some cases, the strength of the fibers may define the strength of the lumber object. In some instances, the fibers of a lumber object may align with a longitudinal axis of the lumber object. Furthermore, the fibers adjacent a surface of the lumber object may define a substantial portion of the strength of the lumber object. As such, avoiding fiber damage along the surface may be particularly advantageous such as avoiding crushing the lumber object. It may also be advantageous to align elongate gripping elements along the fibers as opposed to across the fibers.

BRIEF DESCRIPTION OF THE DRAWINGS

The present embodiments will become more fully apparent from the following description and appended claims, taken in conjunction with the accompanying drawings.

Understanding that the accompanying drawings depict only typical embodiments, and are, therefore, not to be considered limiting of the scope of the disclosure, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities that are in direct contact with each other and/or are separated from each other only by a fastener of any suitable variety (e.g., an adhesive, stitching, etc.). When two entities are described as being "pivotably" coupled together, the two entities may rotate relative to each other about a pivot point and may be constrained so as to prevent translation relative to each other.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

The terms "a" and "an" can be described as one, but not limited to one. For example, although the disclosure may recite an element having, e.g., "an opening," the disclosure also contemplates that the element can have two or more openings.

Unless otherwise stated, all ranges include both endpoints and all numbers between the endpoints.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Not every embodiment is shown in the accompanying illustrations, however, at least a preferred embodiment is shown. At least some of the features described for a shown preferred embodiment are present in other embodiments.

Figure 1:
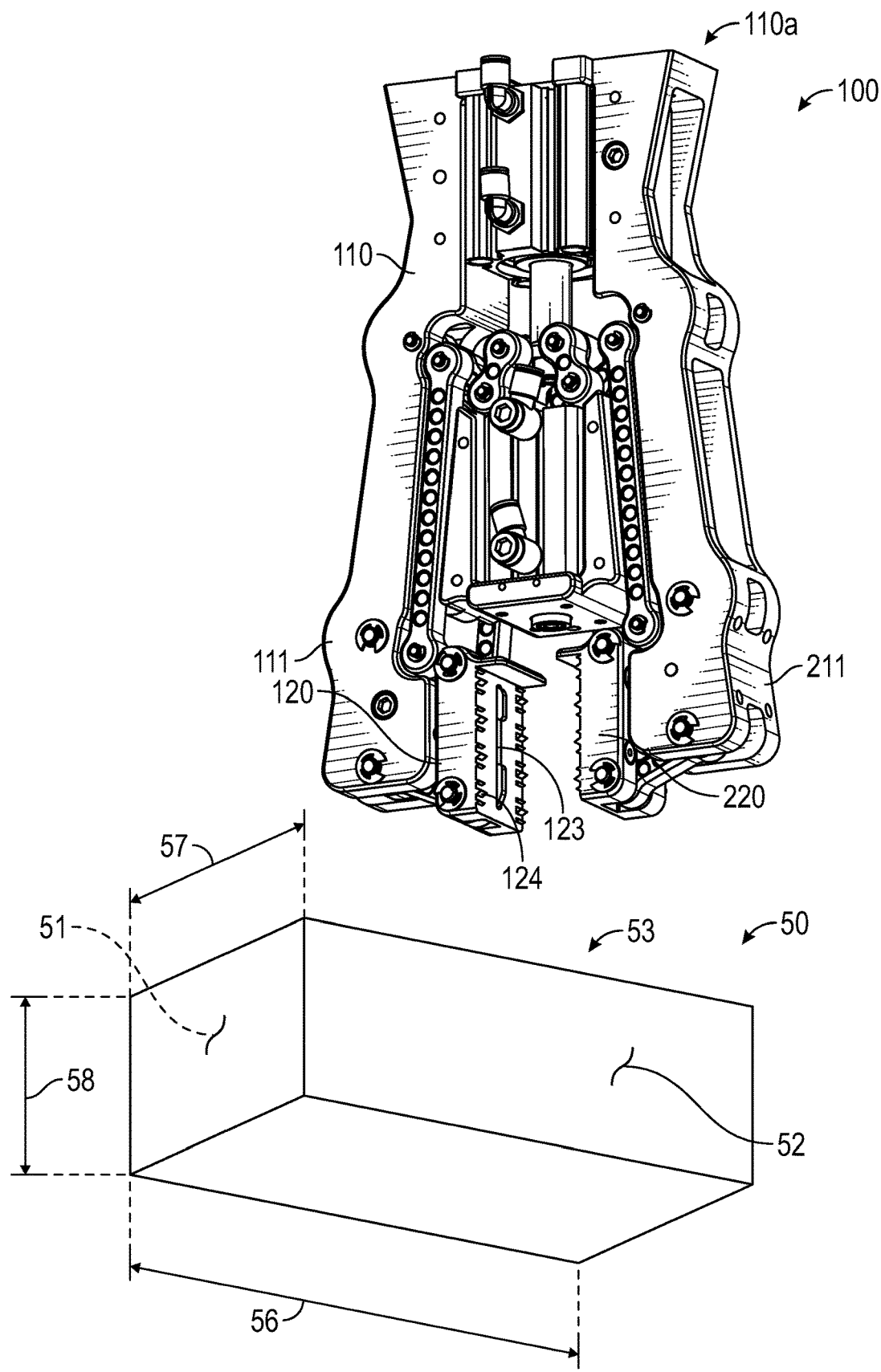
FIG. 1 is a front perspective view of an end-of-arm tool (EOAT) according to one embodiment.

FIG. 1 is a perspective front view of an end-of-arm tool (EOAT) 100 together with a perspective view of a lumber object 50 for reference. The lumber object 50 includes a first side 51, a second side 52 opposite the first side 51. The first side 51 and the second side 52 may or may not be parallel to each other. The lumber object 50 includes a third side 53 that may be orthogonal to the first side 51 and the second side 52 or may not be orthogonal to either of the first side 51 or the second side 52. The lumber object 50 includes a length 56, a width 57 extending between the first side 51 and the second side 52, and a height 58. The length 56 is greater than the width 57 and the height 58. The width 57 may be greater than or less than the height 58. The lumber object 50 may be a regular or non-regular polygon having three or more sides extending between ends. The lumber object 50 may be formed of wood, plastic, or any other suitable structural material.

The EOAT 100 may be coupled to a distal end of a robotic arm 20. The EOAT 100 may be configured to grip and release the lumber object 50 as described in detail below. For convenience in description, a longitudinal axis 119 may be defined as extending vertically through a center of the EOAT 100. In the illustrated embodiment, the EOAT 100 may comprise a symmetrical structure in some respects. More specifically, the EOAT 100 may comprise symmetrical portions about the longitudinal axis 119 front to back and/or left to right. In other embodiments, the EOAT 100 may not comprise symmetrical portions. The EOAT 100 may include a first side shown on the left and a second side shown on the right. The detailed description of the EOAT 100 that follows below describes the portions, components, and functionality of the first side. Identical portions, components, and functionality may be present on the second side even though such portions, components, and functionality of the second side may not be directly described herein. In similar fashion, identical portions, components, and functionality may be present on the back side even though such portions, components, and functionality of the back side may not be directly described herein. The detailed description of the first side that follows may be applied to the second side. The components and features of the first side are designated by 100 series reference numerals. Components and features of the second side, when referenced, are designated by 200 series reference numerals. Accordingly, like features and/or components of the second side are designated with like reference numerals of the first side, with the leading digits incremented to "2." For example, the frame 110 may comprise a first arm 111 on the first side and a second arm 211 on the second side. For simplicity and readability of the following disclosure and as the following description consistently refers to the portions, components, and functionality of the first side, the descriptor "first" may not always be repeated.

The EOAT 100 may comprise a frame 110 configured to be coupled to a robotic arm (not shown) at a proximal end 110a. As stated above, the frame 110 may comprise a first arm 111 and a second arm 211 extending in a distal direction and defining a gap between the first arm 111 and a second arm 211. The frame 110 may comprise features such as holes and slots, for example, to facilitate coupling of the frame 110 with other components as described below. The frame 110 may be formed of a rigid material such as steel, aluminum, or other suitable rigid structural material. The frame 110 may further comprise cross-sectional shapes to establish a strength of the frame 110 in specific directions such as a strength to withstand a separating force between the first arm 111 and the second arm 211.

The EOAT 100 may comprise a first jaw 120 coupled to the first arm 111 and a second jaw 220 coupled to the second arm 211. The first jaw 120 and the second jaw 220 are positionable relative to each other in response to actuation of a first actuator 151. The first jaw 120 and the second jaw 220 are positionable toward each other to define a gripping configuration and are likewise positionable away from each other (e.g., relative to the gripping configuration) to define an open configuration. The first jaw 120 includes a first face 121 and the second jaw 220 includes a second face 221. In the illustrated embodiment, the first face 121 and the second face 221 may be parallel to each other. In other embodiments, the first face 121 and the second face 221 may not be parallel to each other. The first jaw 120 may include a plurality of teeth 124 and an opening 123 extending through the first face 121 as further described below. The opening 123 may be in the shape of a slot.

Figure 2:
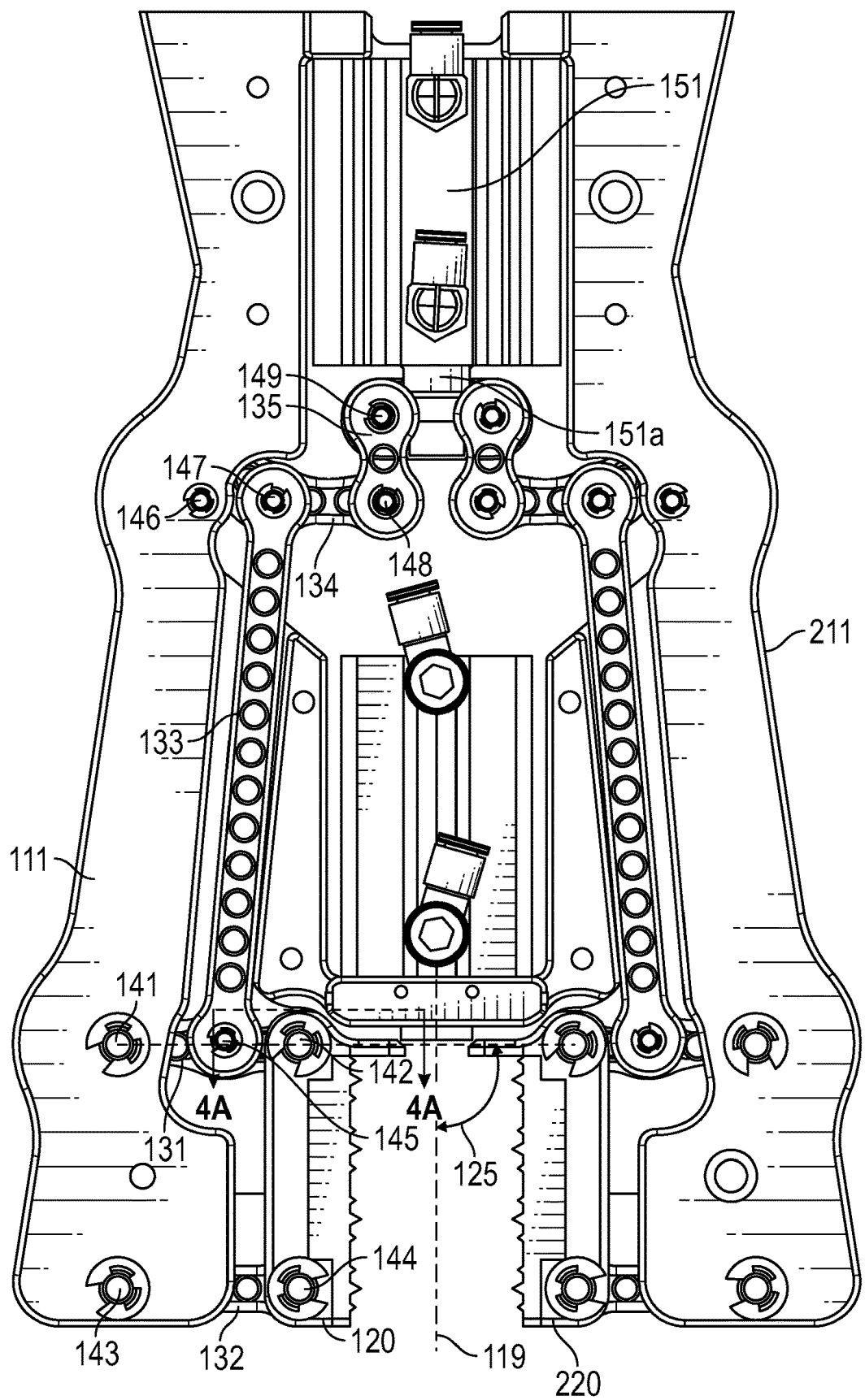
FIG. 2 is a front view of the EOAT of FIG. 1 with the jaws disposed in a gripping configuration.
Figure 3:
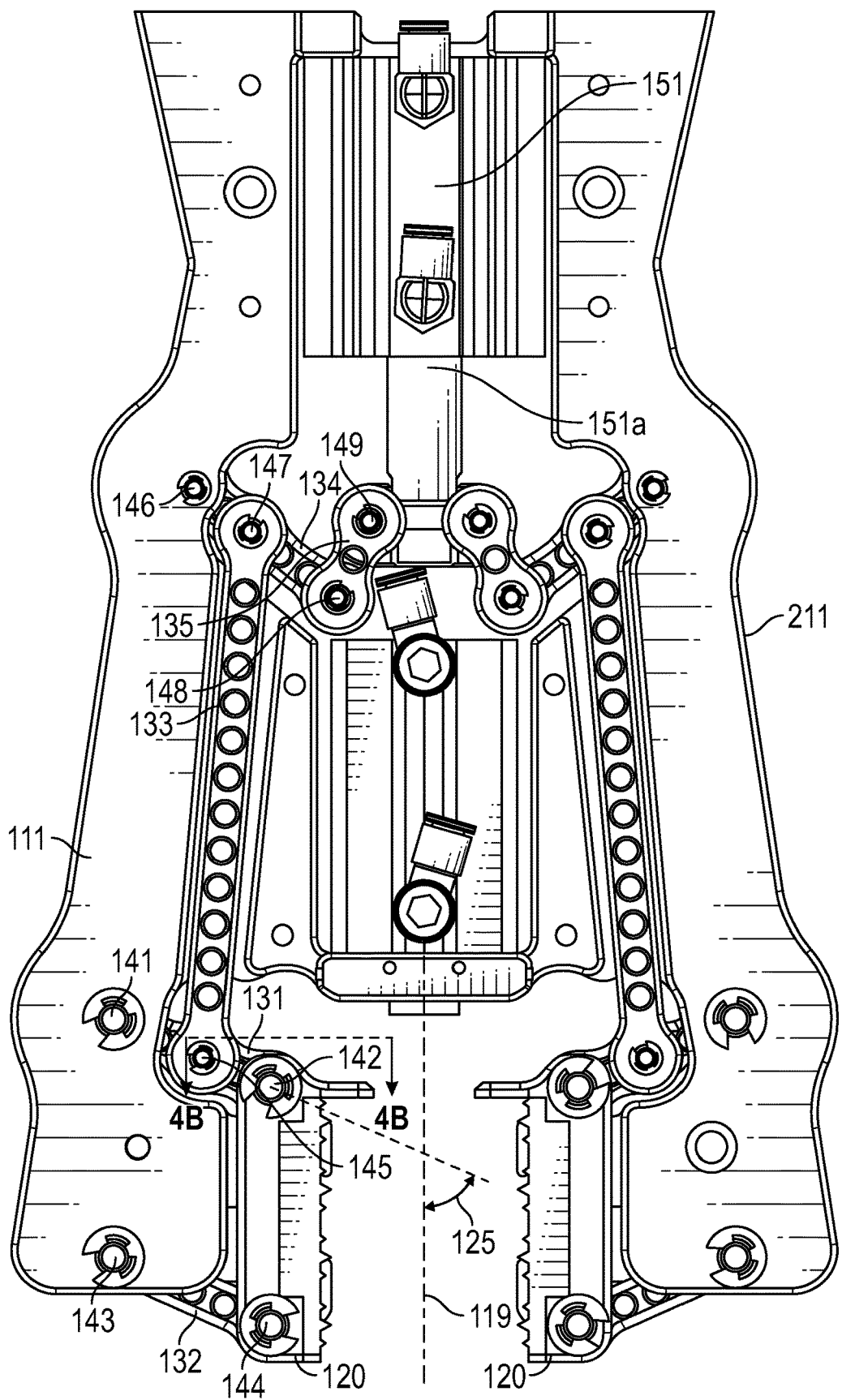
FIG. 3 is a front view of the EOAT of FIG. 1 with the jaws disposed in an open configuration.

FIG. 2 is a front view of the EOAT 100 in the gripping configuration and FIG. 3 is a front view of the EOAT 100 in the open configuration. The first jaw 120 and the second jaw 220 are each in a gripping configuration (or gripping position) in FIG. 2 and the first jaw 120 and the second jaw 220 are each in an open configuration (or open position) in FIG. 3. In the illustrated embodiment, the first jaw 120 and the second jaw 220 are separated from each other by a first separation distance D1 when the EOAT 100 is in the gripping configuration. Similarly, the first jaw 120 and the second jaw 220 are separated from each other by a second separation distance D2 when the EOAT 100 is in the open configuration and the second separation distance may be greater than the first separation distance. As such, the first separation distance may be about equal to the width 57 of the lumber object 50 as further described below and the second distance may be greater than the width 57.

As shown, the first jaw 120 and the second jaw 220 are operably coupled to the frame 110 and the first actuator 151 via multiple linking members. The first actuator 151 may be rigidly attached to the frame 110. In some embodiments, the first actuator 151, which may be a linear actuator, may be disposed along the longitudinal axis 119. In the illustrated embodiment, the first jaw 120 and the second jaw 220 are coupled to the frame 110 and the first actuator 151 in a similar fashion comprising similar linking members. The detailed description that follows with regard to the coupling of the first jaw 120 to the frame 110 and the first actuator 151 may thus be applied to the coupling of the second jaw 220 to the frame 110 and the first actuator 151. As such, the detailed description of the coupling of the first jaw 120 to the frame 110 and the first actuator 151 may thus not be repeated for the second jaw 220 although components, features, operation, and functionality may be similar, or even the same.

The first jaw 120 may be coupled to the first arm 111 of the frame 110 via a first jaw link 131 and a second jaw link 132. The first jaw link 131 may be pivotably coupled to the first arm 111 of the frame 110 at a first pivot point 141 and pivotably coupled to the first jaw 120 at a second pivot point 142. Similarly, the second jaw link 132 may be pivotably coupled to the first arm 111 of the frame 110 at a third pivot point 143 and pivotably coupled to the first jaw 120 at a fourth pivot point 144. The first jaw 120, the first arm 111, the first jaw link 131, and the second jaw link 132 may thus define a four-bar linkage. In the illustrated embodiment, the distance between the first pivot point 141 and the second pivot point 142 may be equal to the distance between the third pivot point 143 and the fourth pivot point 144. Similarly, the distance between the first pivot point 141 and the third pivot point 143 may be equal to the distance between the second pivot point 142 and the fourth pivot point 144. As such, the first, second, third, and fourth pivot points 141, 142, 143, 144 may define a parallelogram so that the first face 121 and the second face 221 remain parallel to each other as the first jaw 120 transitions between the gripping configuration and the open configuration. In other embodiments, the distance between the first pivot point 141 and the second pivot point 142 may not be equal to the distance between the third pivot point 143 and the fourth pivot point 144. Similarly, in some embodiments, the distance between the first pivot point 141 and the third pivot point 143 may not be equal to the distance between the second pivot point 142 and the fourth pivot point 144. As such, the first, second, third, and fourth pivot points 141, 142, 143, 144 may define a polygon other than a parallelogram and the first face 121 and the second face 221 may not remain parallel to each other, or remain at a defined angle relative to each other, as the first jaw 120 transitions between the gripping configuration and the open configuration.

In the illustrated embodiment, the first jaw link 131 may form an angle 125 with respect to the longitudinal axis 119. In the illustrated embodiment, the second jaw link 132 may be parallel with the first jaw link 131 and therefore, the second jaw link 132 may form an angle with respect to the longitudinal axis 119 that is equal to the angle 125. As shown in FIG. 2, when the EOAT 100 is disposed in the gripping configuration, the angle 125 is about 90 degrees. Accordingly, the first, second, third, and fourth pivot points 141, 142, 143, 144 may substantially define a rectangle when the EOAT 100 is disposed in the gripping configuration. When the EOAT 100 is disposed in the open configuration as shown in FIG. 3 the angle 125 is less than 90 degrees. As the EOAT 100 transitions between the gripping configuration and the open configuration, the first jaw 120 follows a circular path since the first and second jaw links 131, 132 rotate about the first and third pivot points 141, 143, respectively. As such, when the EOAT 100 transitions away from the open configuration toward the gripping configuration, the first jaw 120 moves in an oblique direction away from the first arm 111, i.e., partially in a transverse direction relative to the longitudinal axis 119 (toward the second jaw 220) and partially in a direction parallel to the longitudinal axis 119. As the EOAT 100 more closely approaches the gripping configuration the first jaw 120 may move more substantially in the parallel direction and minimally in the transverse direction.

Referring further to FIGS. 2 and 3, the EOAT 100 may comprise a transfer link 133 and a lever link 134. The lever link 134 may be coupled to the frame 110 at a sixth pivot point 146. The first transfer link 133 may be pivotably coupled to the first jaw link 131 at a fifth pivot point 145 and the lever link 134 at a seventh pivot point 147 so that rotation of the lever link 134 about the sixth pivot point 146 is converted to rotation of the first jaw link 131 about the first pivot point 141. The EOAT 100 may further comprise a second transfer link 135. The second transfer link 135 may be coupled to the lever link 134 at an eighth pivot point 148 and coupled to a first actuator 151 (e.g., a plunger 151a of the first actuator 151) at a ninth pivot point 149. Pursuant to front to back symmetrical nature of the EOAT 100 a duplicate first transfer link 133 and a duplicate second transfer link 135 may be disposed on the back side of the EOAT 100. The duplicate first and second transfer links 133, 135 disposed on the back may comprise the same connectivity and functionality as the first and second transfer links 133, 135 disposed on the front side.

Actuation of the first actuator 151, for example, displacement of the first actuator plunger 151a, may transition the EOAT 100 between the gripping configuration as illustrated in FIG. 2 and the open configuration as illustrated in FIG. 3. Extension of the first actuator plunger 151a may displace the second transfer link 135 that may then be converted into rotation of the lever link 134 about the sixth pivot point 146. Rotation of the lever link 134 about the sixth pivot point 146 may be converted into longitudinal displacement of the first transfer link 133 that may then be converted into rotation of the first jaw link 131 about the first pivot point 141. Rotation of the first jaw link 131 about the first pivot point 141 may then move the first jaw 120 away from the gripping configuration toward the open configuration as described above. Retraction of the first actuator plunger 151a may similarly and conversely move the first jaw 120 away from the open configuration toward the gripping configuration. As such, the first actuator plunger 151a may be disposed in a retracted position when the EOAT 100 is in the gripping configuration and an extended position when the EOAT 100 is in the open configuration.

The design aspects, such as mechanical advantage(s) and the distances, lengths, and ratios of the components (e.g., links, pivot points, actuator(s)) of the EOAT 100 defining the mechanical advantage(s), may be designed within constraints and according to a given application or use of the EOAT 100. In determining design aspects, consideration is given to the material of the object(s) to be picked up or grasped by the EOAT 100. As can be appreciated, different materials have different compression specifications; soft wood compresses more readily than hardwood, which compresses more readily than concrete or metal, for example. For example, in an application grasping wood, the mechanical advantage(s) within the EOAT 100 will be appropriate to press the teeth of the jaws into the wood without crushing the wood. A compression specification of the material may provide an upper bound on one or more design aspects.

In determining design aspects, consideration is also given to one or more of a min and max size (length, width, height) and a min and max mass of the object(s) to be picked up by the EOAT 100. The material and the size and mass of the object(s) to be picked up may be considered at least for determining a size of a contact surface of the jaws with the EOAT 100.

The size of the contact surface may provide lower bound constraints as influenced by where the object is to be positioned. For example, the contact surface may be constrained to a size small enough to handle constraints of the placement position and large enough to secure the object while it is gripped by the EOAT 100. The size of the contact surface determination may be influenced by potential reactionary forces anticipated from interactions of the object with other objects. A larger object, with a considerable length, that may be bumped at an end by another object (e.g., creating a lever force) will need to be grasped with a larger contact surface than a shorter object or similar sized object that will not encounter reactionary forces during grasping by the EOAT 100.

Based on the size of the contact surface, the compression specification of the object, and the size of the object (and any anticipated reactionary forces to be encountered) a determination can be made of an amount of force needed to be applied to the contact surface to achieve a secure grasp of the object with the contact surface and without exceeding the compression specification. The determined amount of force can then specify a point of contact of the cam over.

Relative distances between pivot points along the lever link 134 and the first jaw link 131 may at least partially define a mechanical advantage between displacement of the first actuator plunger 151a and displacement of the first jaw 120. In the illustrated embodiment, the distance between the sixth pivot point 146 and the seventh pivot point 147 may define a first lever length and the distance between the sixth pivot point 146 and the eighth pivot point 148 may define a second lever length. As such, a longitudinal displacement of first actuator plunger 151a may be greater than a longitudinal displacement of the first transfer link 133 by a first factor of mechanical advantage defined by the ratio of second lever length divided by the first lever length. Similarly, a compressive force along the first transfer link 133 may be greater than a force of the first actuator plunger 151a by the first factor of mechanical advantage.

The linked relationship between the first transfer link 133 and first jaw 120 may define a second factor of mechanical advantage. The second factor of mechanical advantage may be defined by a ratio of a longitudinal displacement of the first transfer link 133 divided by a transverse displacement of the first jaw 120. In the illustrated embodiment, the distance between first pivot point 141 and fifth pivot point 145 may define a third lever length and the distance between the first pivot point 141 and the second pivot point 142 may define a fourth lever length. Accordingly, the second factor of mechanical advantage may be trigonometrically estimated by a ratio of the third lever length divided by the fourth lever length multiplied by the tangent of the angle 125. It accordingly follows that a force of the first jaw 120 in the transverse direction may be greater than a longitudinal force along the first transfer link 133 by the second factor of mechanical advantage. As the EOAT 100 approaches the gripping configuration and the angle 125 accordingly approaches 90 degrees, the tangent of the angle 125 significantly increases. Hence, the second factor of mechanical advantage may significantly increase as the EOAT 100 approaches the gripping configuration.

In some embodiments, the first actuator plunger 151a may retract sufficiently to cause the angle 125 to be greater than 90 degrees when the EOAT 100 is disposed in the gripping configuration so as to define an over-center or cam-over condition of the first jaw 120. Such an over-center condition may provide for the EOAT 100 to remain disposed in the gripping configuration when energy is removed from the first actuator 151. In other words, a lumber object 50 may remain gripped when an extracting force is removed from the first actuator plunger 151a (e.g., when power to the robotic arm and/or EOAT 100 is lost).

Figure 4A:
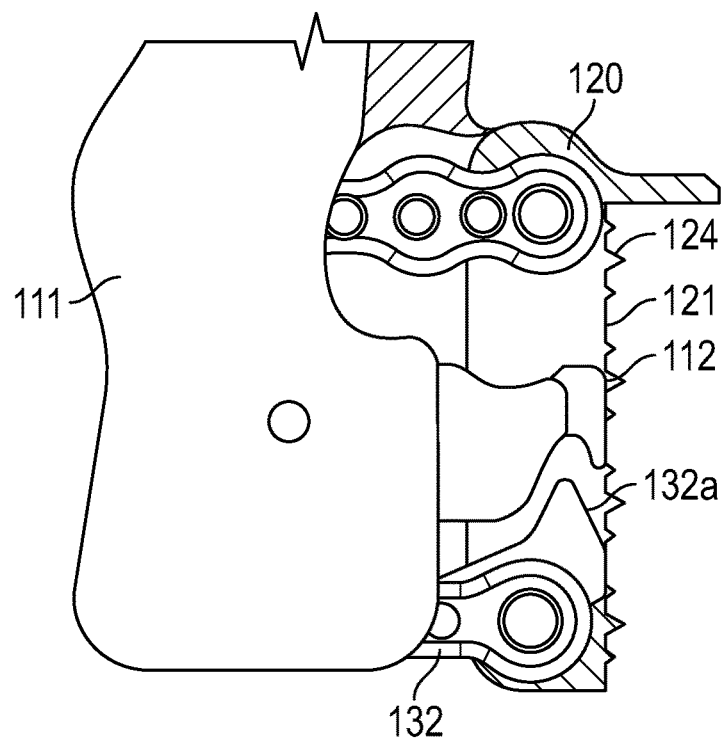
FIG. 4A is a partial-sectional detail view of a portion of the first jaw in the gripping configuration with the first jaw sectioned along sectioning line 4A-4A as shown in FIG. 2.

FIG. 4A is a front partial-sectional detail view of the of the first frame arm 111, the first jaw 120, and the first and second jaw links 131, 132 with the EOAT 100 disposed in the gripping configuration. As shown, the frame 110 may include a first lateral frame extension 112 extending toward the second frame arm 211 (see FIG. 3). The first lateral frame extension 112 may define a protrusion sized and positioned to extend through the opening 123. As shown, the first lateral frame extension 112 may be sized so that the first lateral frame extension 112 does not extend beyond, or protrude from, the first face 121 of the first jaw 120 when the first jaw 120 is in the gripping configuration. The EOAT 100 may also comprise a corresponding second lateral frame extension 212 extending inward from the second arm 211 (see FIG. 3) of the frame 110. Since the first lateral frame extension 112 and the second lateral frame extension 212 are fixed to the frame 110, the distance between the first lateral frame extension 112 and the second lateral frame extension 212 may be greater than the width 57 of the lumber object 50.

As further shown in FIG. 4A, the second jaw link 132 may include a first link extension 132a. The first link extension 132a may extend longitudinally beyond the fourth pivot point 144 and may also extend in a lateral direction of the second jaw link 132. In the illustrated embodiment, the first link extension 132a may be sized and positioned to extend through the opening 123. In another embodiment, the first link extension 132a may extend through an opening other than the opening 123. As shown, the first link extension 132a may be sized and shaped so that the first link extension 132a does not extend beyond the first face 121 of the first jaw 120 when the first jaw 120 is in the gripping configuration. In other words, when the first jaw link 131 is oriented to define an angle 125 of about 90 degrees with longitudinal axis 119, the first link extension 132a is rotated away from the first face 121 so as to not protrude from the first face 121.

Figure 4B:
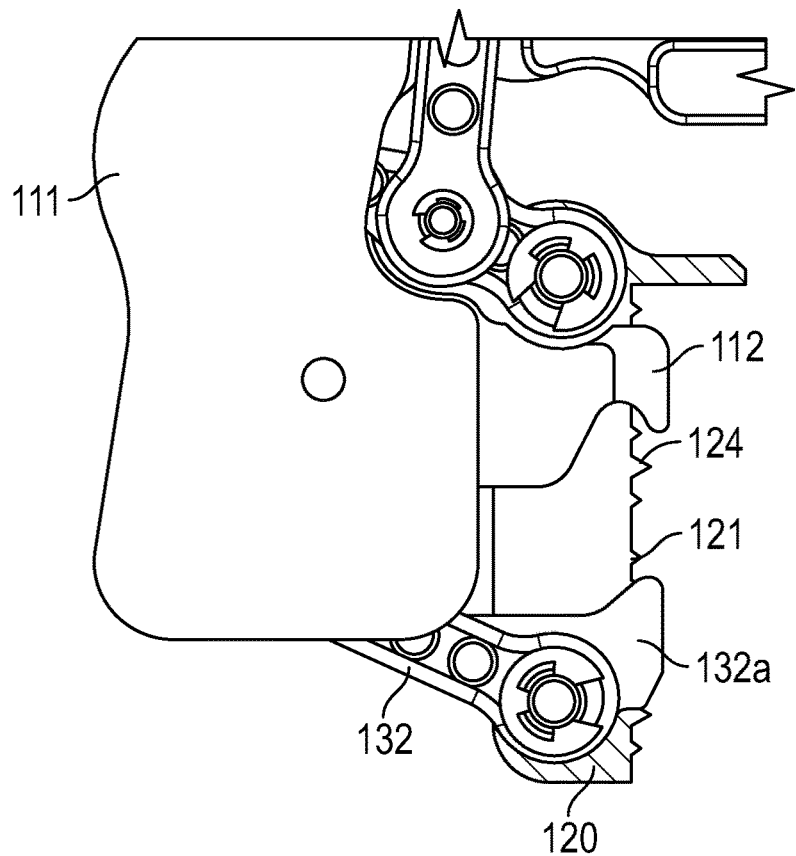
FIG. 4B is a partial-sectional detail view of a portion of the first jaw in the open configuration with the first jaw sectioned along sectioning line 4B-4B as shown in FIG. 3.

FIG. 4B is a front partial-sectional detail view of the of the first frame arm 111, the first jaw 120, and the first and second jaw links 131, 132 similar to FIG. 4A except with the EOAT 100 disposed in the open configuration. As shown, when the first jaw 120 is disposed in the open configuration, the first lateral frame extension 112 and the first link extension 132a may protrude from the first face 121 of the first jaw 120. In the illustrated embodiment, the first lateral frame extension 112 and the first link extension 132a may also extend beyond the plurality of the teeth 124 of the first jaw 120. As such, the first lateral frame extension 112 and the first link extension 132a may displace the lumber object 50 (see FIG. 1) away from the plurality of the teeth 124 when the EOAT 100 transitions from the gripping configuration toward the open configuration.

Figure 5:
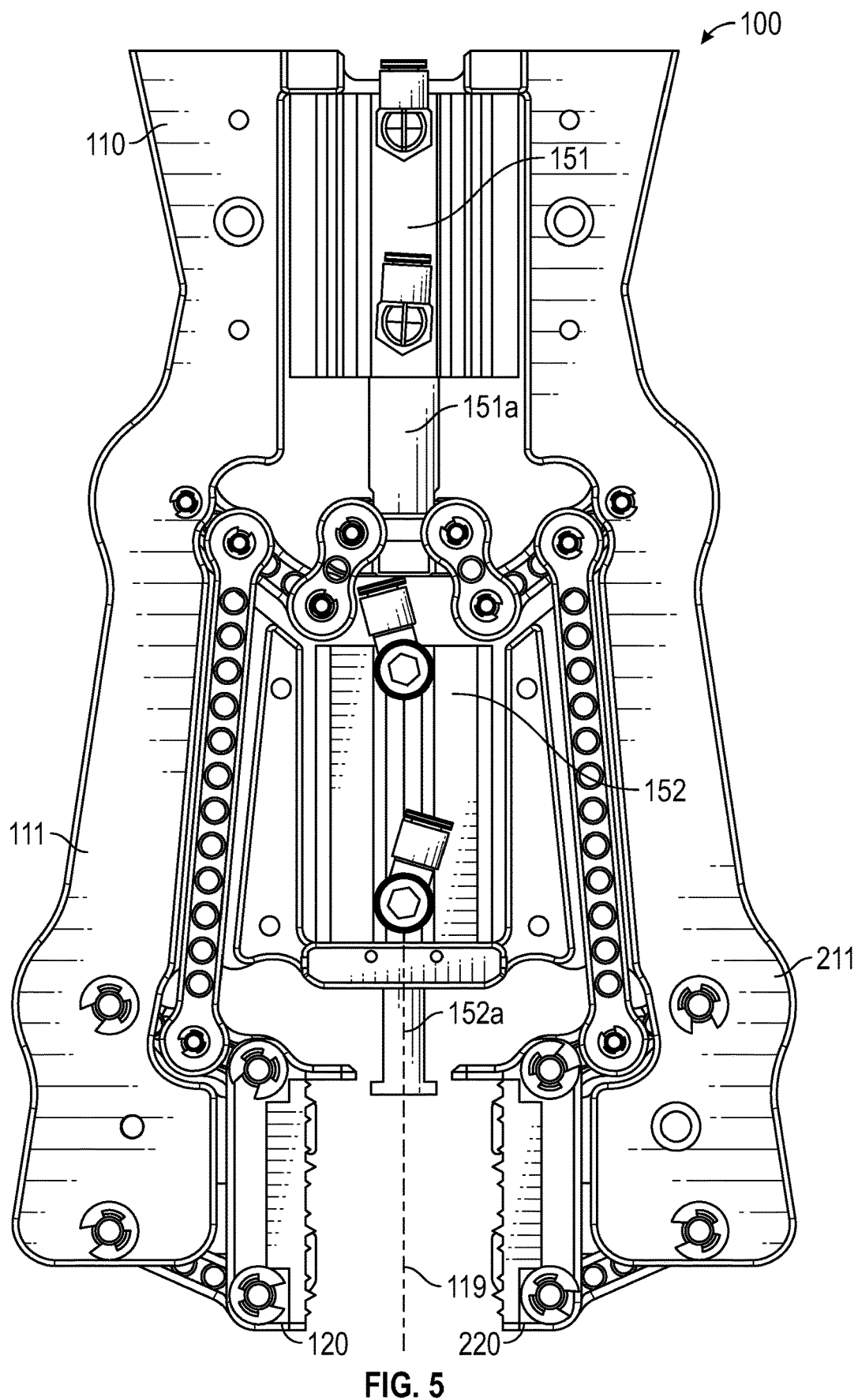
FIG. 5 is a front view of the EOAT of FIG. 1 with the jaws disposed in an open configuration and an extractor disposed in an extended position between the jaws.

Referring to FIG. 5, the EOAT 100 may comprise a second actuator 152 including a second actuator plunger 152a or extractor. In the illustrated embodiment the second actuator 152 may be disposed along the longitudinal axis 119. The second actuator 152 is coupled to the frame 110 so that the second actuator plunger 152a may extend between the first jaw 120 and the second jaw 220 when the EOAT 100 is disposed in the open configuration. In some embodiments, the second actuator plunger 152a may also extend to a position between the first jaw 120 and the second jaw 220 when the EOAT 100 is disposed in the gripping configuration. The second actuator plunger 152a may extend beyond a distal end of the first jaw 120 and the second jaw 220. The second actuator plunger 152a may contact a lumber object 50 disposed between the first jaw 120 and the second jaw 220. The second actuator plunger 152a may apply a force to the third side 53 of lumber object 50. In some instances, second actuator plunger 152a may apply a downward force on the lumber object 50 so as to stabilize the lumber object 50 on a horizontal surface 60. In some instances, the second actuator plunger 152a may apply a downward force on the lumber object 50 to hold the lumber object 50 against the horizontal surface 60 while the first jaw 120 and the second jaw 220 are displaced away from their respective gripping configurations. In some instances, the second actuator plunger 152a may apply a downward force on the lumber object 50 to hold the lumber object 50 against the horizontal surface 60 while the EOAT 100 is moved away from the lumber object 50 by the robotic arm.

Figure 6:
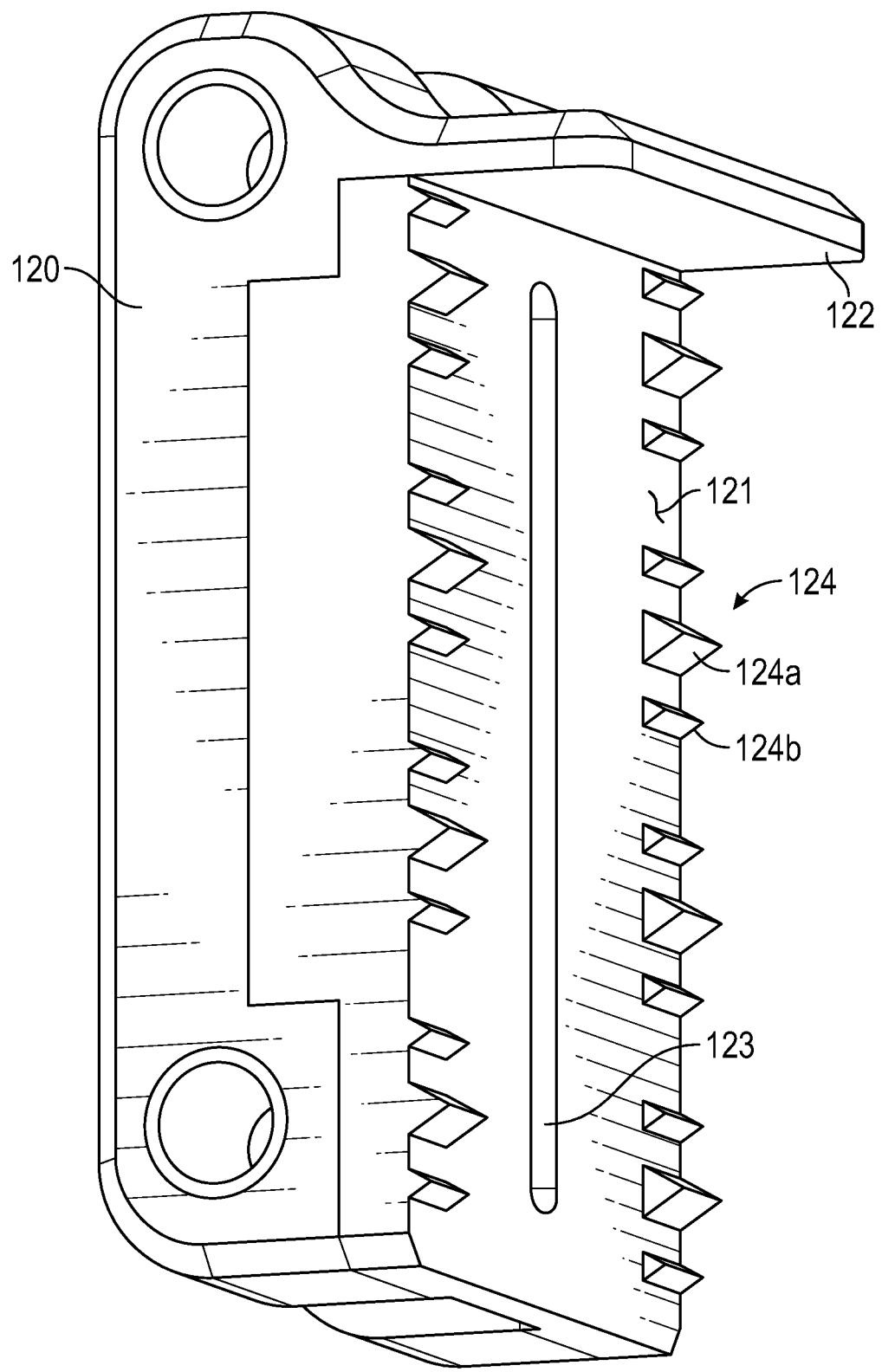
FIG. 6 is a perspective detail view of the first jaw of the EOAT of FIG. 1.

FIG. 6 illustrates details of the first jaw 120 of the EOAT 100. As stated above, the first jaw 120 may comprise a first face 121. The first jaw 120 may also comprise a first top flange 122. The first top flange 122 may extend away from the first face 121 a defined length. The length may be defined by a width dimension of the lumber object 50. For example, the length of the first top flange 122 may be about half or less than half of the width of the lumber object 50. In some embodiments, a portion of the first top flange 122 may extend farther than a width of the lumber object 50. The first top flange 122 may extend across a width of the first jaw 120. In some embodiments, the first top flange 122 may not extend across the entire width of the first jaw 120 or the first top flange 122 may extend beyond the width of the first jaw 120. The first top flange 122 may extend orthogonal to the first face 121, or may be otherwise disposed transverse to or at an angle relative to the first face 121. In some embodiments, the first top flange 122 may be omitted. Further, in some embodiments, the first top flange 122 may comprise an opening or relief cut to provide passage or clearance for the second actuator plunger 152a.

The first jaw 120 may comprise a plurality of teeth 124 protruding away from the first face 121. The plurality of teeth 124 may be configured to penetrate the lumber object 50 when the EOAT 100 is disposed in the gripping configuration so as to inhibit sliding of the lumber object 50 along the first face 121. The plurality of teeth 124 may be disposed in one or more rows (e.g., vertical rows), which may be positioned along opposite width edges of the first face 121. The plurality of teeth 124 may include teeth of different heights. As illustrated, the plurality of teeth 124 may comprise a subset of taller teeth 124a and a subset of the shorter teeth 124b. In the illustrated embodiment, each taller tooth 124a may be flanked by a shorter tooth 124b on each side. One or more of the plurality of teeth 124 may comprise an elongate top edge configured to substantially align with fibers of the lumber object 50.

Figure 7A:
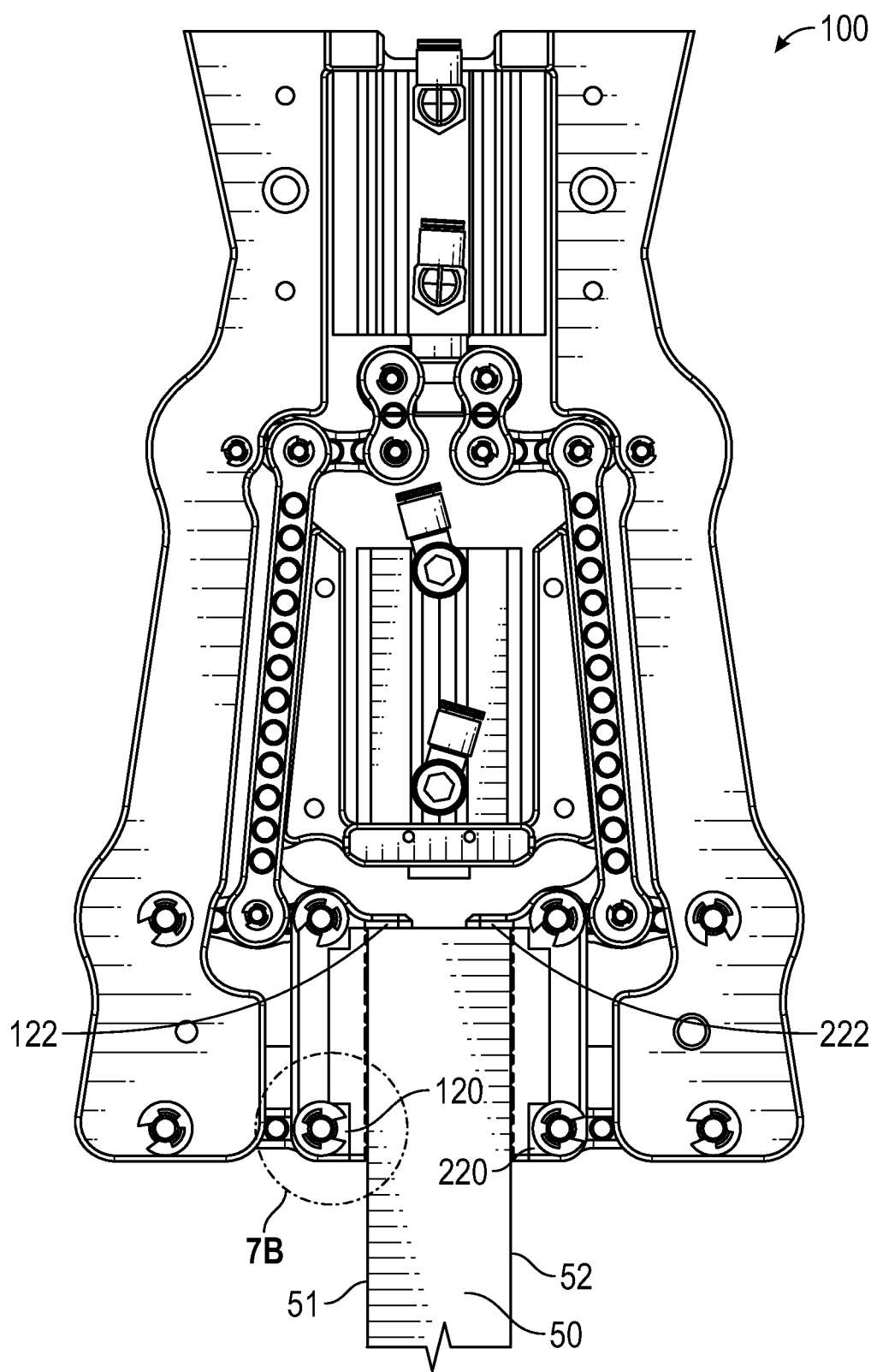
FIG. 7A is a front view of the EOAT of FIG. 1 with the jaws disposed in the gripping configuration gripping a lumber object.

FIG. 7A illustrates the EOAT 100 gripping the lumber object 50. The first face 121 (see FIG. 6) of the first jaw 120 is disposed adjacent the first side 51 of the lumber object 50 and the second face 221 (see FIG. 6) of the second jaw 220 is disposed adjacent the second side 52. The third side 53 of the lumber object 50 is adjacent the first top flange 122 and a second top flange 222.

Figure 7B:
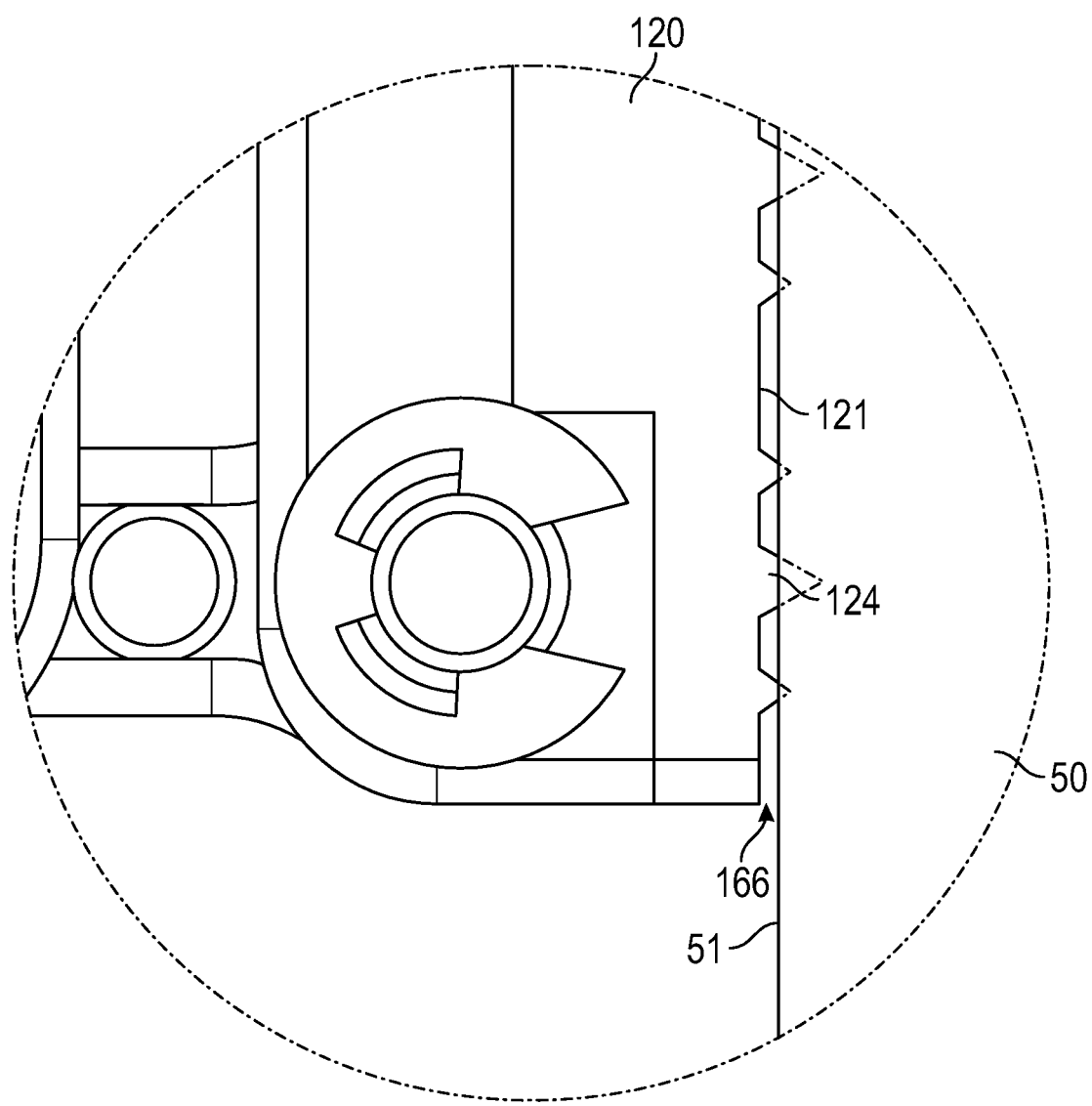
FIG. 7B is a detail view of the first jaw of FIG. 7A.

FIG. 7B is illustrates details of the first jaw 120 in relation to a lumber object 50 when the EOAT 100 is in the gripping configuration. In some instances, it may be advantageous to grip the lumber object 50 such that the teeth 124 penetrate the lumber object 50 while maintaining a clearance 166 between the first face 121 and the lumber object 50. Gripping the lumber object 50 in such a way may secure the lumber object 50 between the first jaw 120 and the second jaw 220 without crushing (e.g., damaging) the lumber object 50 between the first face 121 and the second face 221. In some instances, the clearance 166 may be zero such that the first face 121 is in contact with and/or applies a force to the lumber object 50 without crushing the lumber object 50.

Figure 8A:
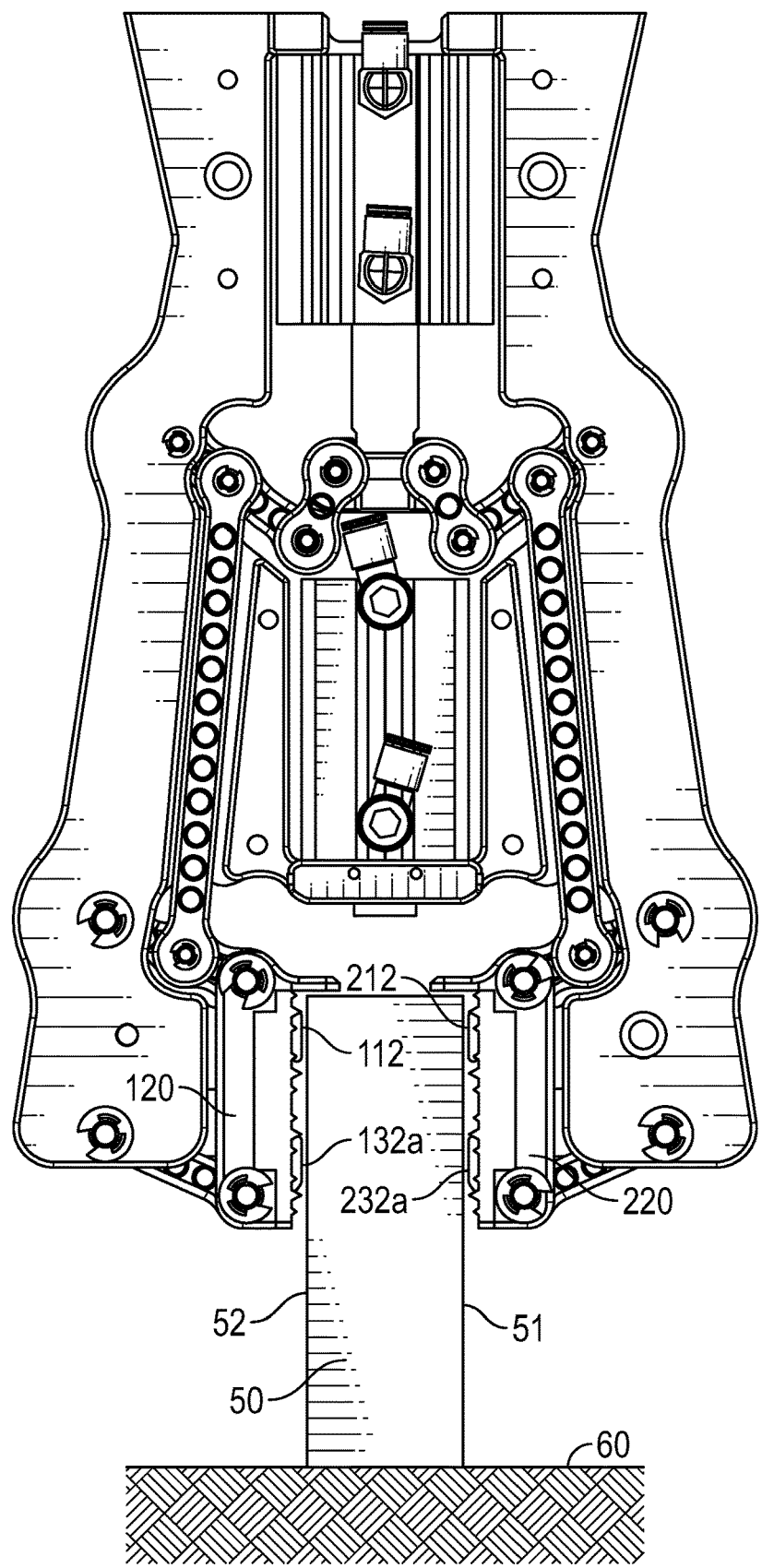
FIG. 8A is a front view of the EOAT of FIG. 1 with the jaws disposed in an open configuration so as to release the lumber object as placed onto a horizontal surface. The extractor is shown in a retracted position.
Figure 8B:
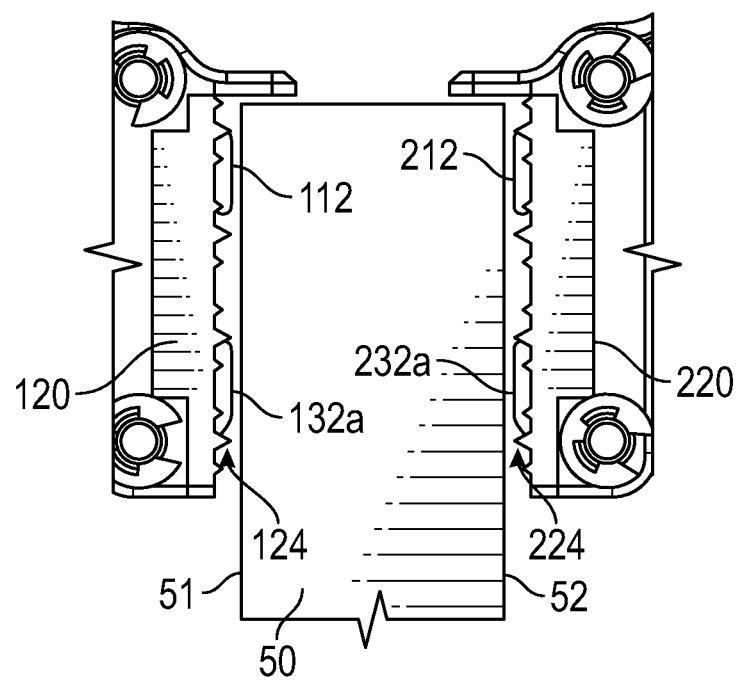
FIG. 8B is a detail view of the jaws of FIG. 8A.

FIGS. 8A and 8B illustrate the EOAT 100 releasing the lumber object 50 onto a horizontal surface 60. In some instances, the EOAT 100 may be used to place the lumber object 50 onto a horizontal surface 60. In other instances, the EOAT 100 may be used to position the lumber object 50 in relation to a tool or other structure element, for example. In some instances, the EOAT 100 may hold the lumber object 50 while a process is performed on the lumber object 50 such as attachment to another lumber object.

In FIGS. 8A and 8B, the EOAT 100 is shown releasing the lumber object 50 onto the horizontal surface 60. The first jaw 120 and the second jaw 220 are displaced away from the lumber object 50 such that the first plurality of teeth 124 and the second plurality of teeth 224 are extracted from and spaced away from the first side 51 and the second side 52, respectively of the lumber object 50. Illustrated also are the first lateral frame extension 112 and the second lateral frame extension 212 spaced away from the first side 51 and the second side 52, respectively. Similarly, the first link extension 132a and the second link extension 232a are also spaced away from the first side 51 and the second side 52, respectively.

Figure 9:
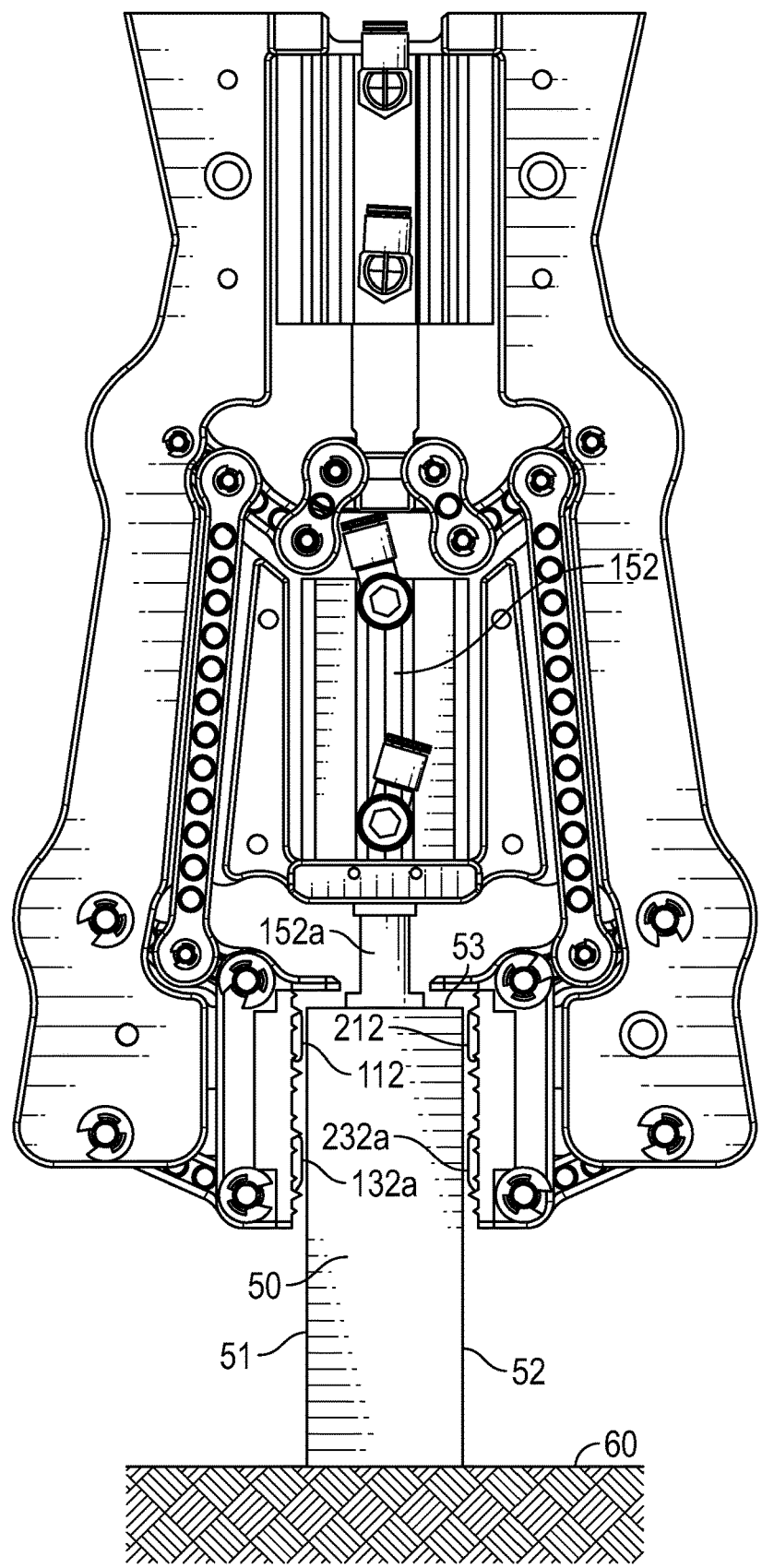
FIG. 9 is a front view of the EOAT of FIG. 1 with the jaws disposed in an open configuration and the extractor extended so as to be in contact with the lumber object.

FIG. 9 illustrates the EOAT 100 engaging the lumber object 50 with the second actuator plunger 152a. The lumber object 50 is released from the first and second jaws 120, 220. The second actuator plunger 152a applies a downward force on the lumber object 50 so as to force the lumber object 50 against the horizontal surface 60. In some embodiments, the second actuator plunger 152a may initially extend and contact the third side 53 of the lumber object 50 when the first and second jaws 120, 220 are in the gripping configuration, i.e., gripping the lumber object 50. In some instances, the lumber object 50 may stick to one of the first jaw 120 or the second jaw 220 so that when the jaw moves from the gripping configuration to the open configuration, the lumber object 50 is moved from its desired position on the horizontal surface 60 or tipped on to one of the first side 51 or the second side 52. By making initial contact of the lumber object 50 with the second actuator plunger 152a while the first and second jaws 120, 220 are in the gripping configuration, the lumber object 50 may be secured between the second actuator plunger 152a and the horizontal surface 60 as the first and second jaws 120, 220 are moved away from the lumber object 50.

An exemplary method of use of the EOAT 100 may comprise one or more of the following steps or processes. The method steps or processes may be interchanged with one another. In other words, unless a specific order of steps or processes is required for proper operation of the embodiment, the order and/or use of specific steps or processes may be modified.

As described above the EOAT 100 is configured to be coupled to and used in conjunction with a robotic arm. The robotic arm may comprise up to seven axes (or degrees of motion), meaning that the EOAT 100 may be displaced and/or oriented consistent with the seven axes or degrees of motion. As such, the robotic arm in combination with EOAT 100 may manipulate the lumber object 50 consistent with the with axes or degrees of motion. Furthermore, the EOAT 100 may be operably coupled to one or more energy sources to facilitate operation of the first and second actuators 151, 152, such as hydraulic, pneumatic, or electrical energy sources.

The EOAT 100 may be configured to be coupled to a second EOAT 100. In other words, the EOAT 100 may comprise holes, alignment pins, threaded fasteners, or other features or components to facilitate the attachment of a pair of EOATs 100 together in a stacked arrangement.

Figure 10:
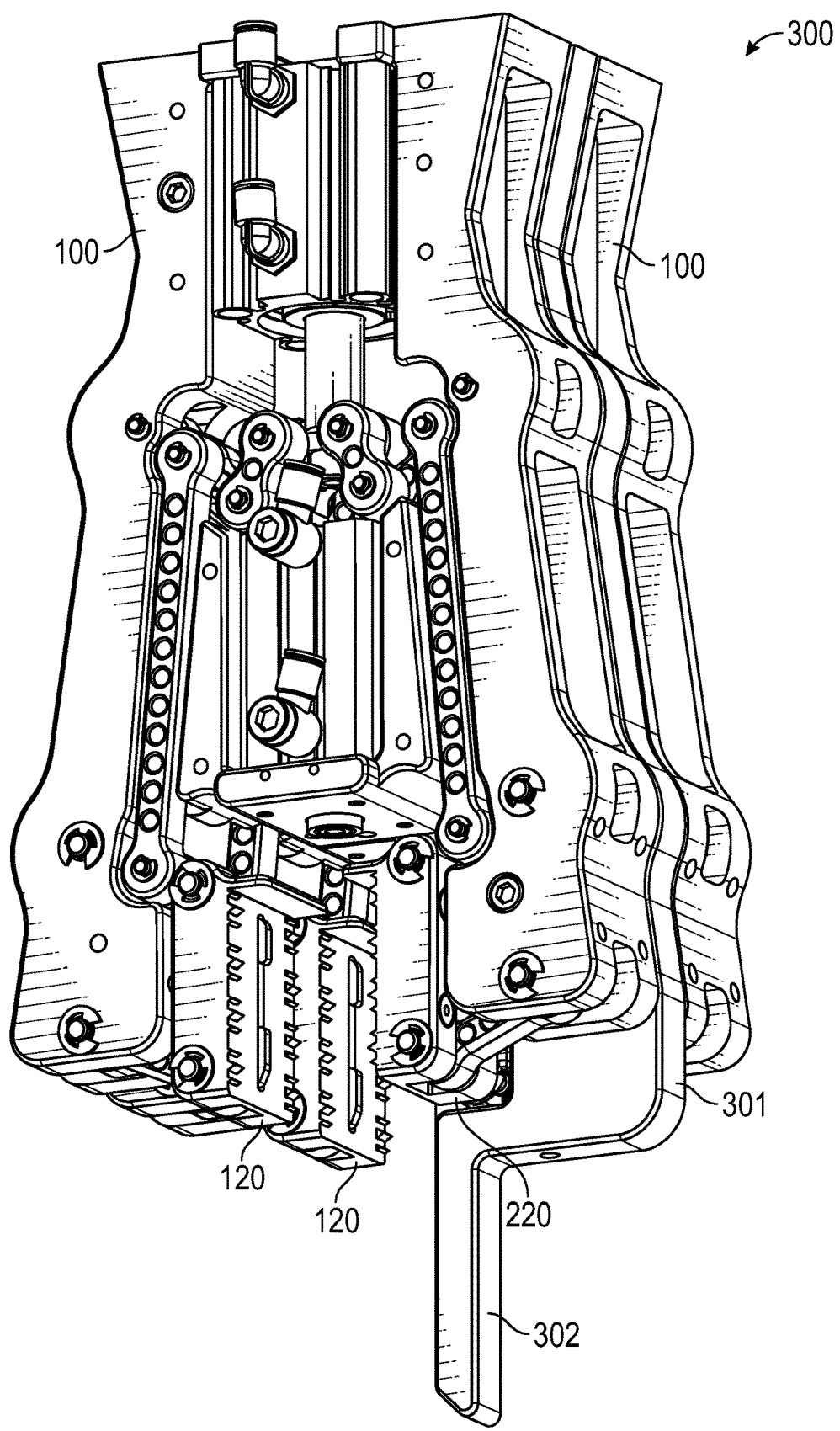
FIG. 10 is a front perspective view of an EOAT assembly comprising a pair of EOATs according to FIG. 1 coupled together with an extension member extending distally from the pair of EOATs.

FIG. 10 is a perspective view of an EOAT assembly 300 comprising two EOATs 100 coupled together. The EOATs 100 may be arranged and/or aligned so that a single lumber object 50 may be gripped with both EOATs 100. The EOATs 100 may be spaced apart so as to grip the lumber object 50 along an extended gripping length of the lumber object 50. In an instance where a lumber object 50 is gripped by a single EOAT 100, the gripping length is defined by a width of the first and second jaws 120, 220. In an instance where a lumber object 50 is gripped by an EOAT assembly 300, the gripping length is extended by at least the width of the second set of first and second jaws 120, 220. More specifically, the lumber object 50 may be gripped by a first EOAT 100 at a first location along the length 56 and by a second EOAT 100 at a second location along the length 56, where the second location is spaced away from the first location.

By extending the gripping length, the lumber object 50 may be more securely handled, especially in the instance where an elongate lumber object 50 is gripped toward one end of the lumber object 50. Extending the gripping length may also inhibit or prevent damage of the lumber object 50 by preventing rotational sliding of the lumber object 50 relative to the first and second jaws 120, 220.

The EOAT assembly 300 may comprise a distal extension 302 extending distally away from the EOATs 100. In some embodiments, the distal extension 302 may be coupled to a separation plate 301 disposed between the EOATs 100. The distal extension 302 may function as a positioning finger. In other words, in some instances, a robotic arm (not shown) may move or otherwise manipulate an object such as the lumber object 50 by contacting the object with the distal extension 302.

Figure 11:
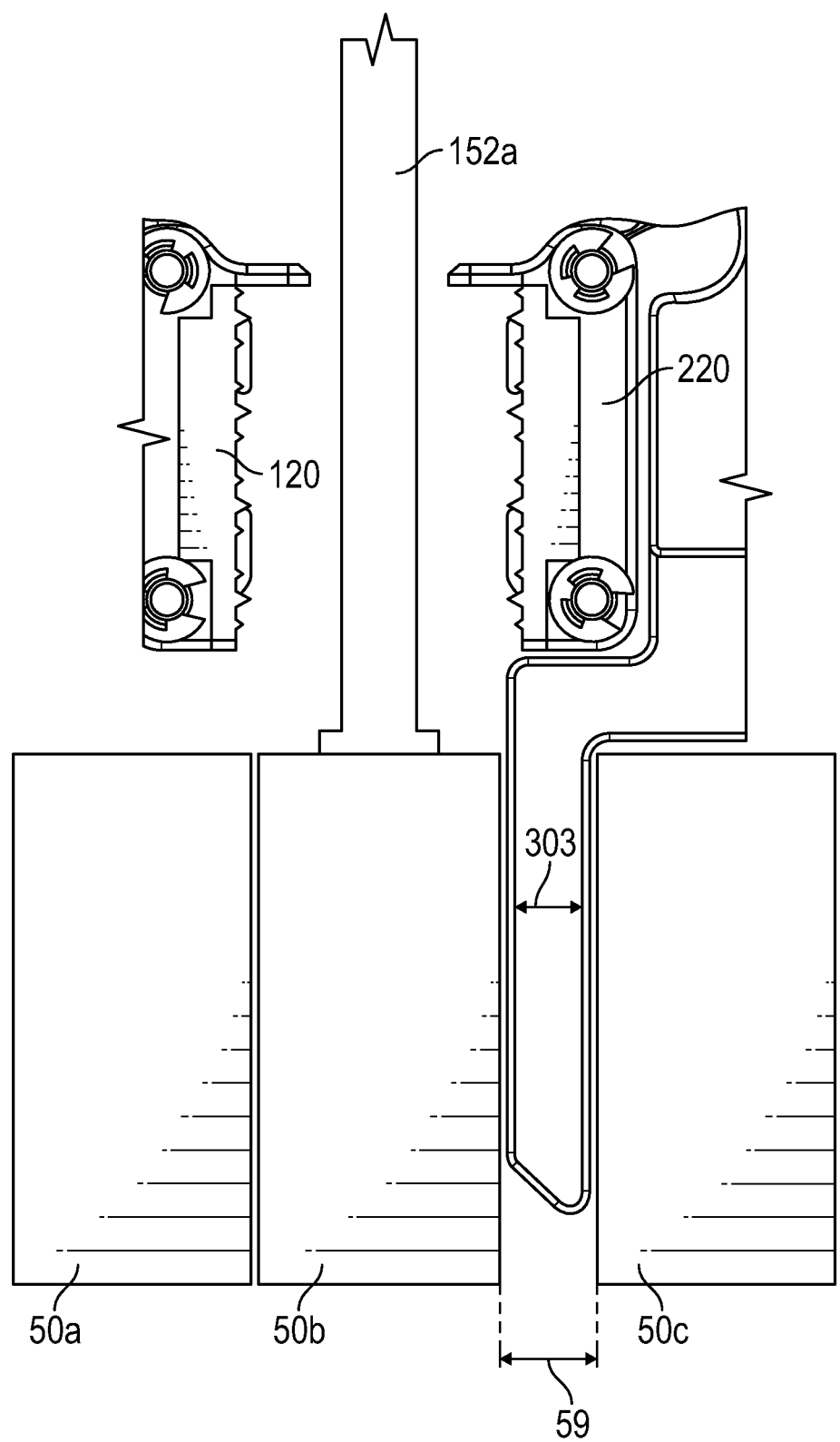
FIG. 11 is a front view of the EOAT assembly of FIG. 10 illustrating placement of the lumber object in relation to other objects.

FIG. 11 is front detail view of a portion of the EOAT assembly 300. Also shown are end views of a first lumber object 50a, a second lumber object 50b, and a third lumber object 50c. In some instances, the EOAT assembly 300 may be used to place a lumber object at a defined location relative to other objects, such as other lumber objects. In one instance, the EOAT assembly 300 may be used to place the second lumber object 50b adjacent the first lumber object 50a. In another instance, the EOAT assembly 300 may be used to place the second lumber object 50b spaced a specific separation distance 59 away from the third lumber object 50c. In some instances, the predetermined separation distance 59 may facilitate a defined assembly process for the second lumber object 50b and the third lumber object 50c. The distal extension 302 may include a width 303. The width 303 may be defined so that when the distal extension 302 is disposed between the second lumber object 50b and the third lumber object 50c, the second lumber object 50b is spaced away from the third lumber object 50c by the predetermined separation distance 59.

In the foregoing description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An end-of-arm tool for a robotic arm, comprising:
 a frame to be coupled to a robotic arm;
 a first jaw coupled to the frame at a distal end of the frame;
 a second jaw coupled to the frame at the distal end of the frame,
 wherein the first jaw is positionable toward the second jaw to define a gripping configuration of the end-of-arm tool and positionable away from the second jaw to define an open configuration of the end-of-arm tool; and
 a first four-bar linkage comprising:
  the frame,
  the first jaw,
  a first jaw link comprising a first end and a second end, the first end of the first jaw link pivotably coupled to the first jaw and the second end of the first jaw link pivotably coupled to the frame opposite the first end of the first jaw link,
  wherein the first jaw link extends away from the first jaw at an angle of about 90 degrees with respect to a longitudinal axis of the end-of-arm tool when the end-of-arm tool is disposed in the gripping configuration; and
  a second jaw link pivotably coupled to the first jaw at a first end of the second jaw link and pivotably coupled to the frame at a second end of the second jaw link opposite the first end of the second jaw link.

2. The end-of-arm tool of claim 1, wherein the first jaw link extends away from the first jaw at a first angle with respect to the longitudinal axis when the end-of-arm tool is disposed in the open configuration, and
 wherein the first angle is less than 90 degrees.

3. The end-of-arm tool of claim 1, wherein the first jaw link and the second jaw link are parallel to each other.

4. The end-of-arm tool of claim 1, further comprising:
 a first transfer link pivotably coupled to the first jaw link at a location between the first end and the second end of the first jaw link; and
 a first lever link,
 wherein the first lever link is pivotably coupled to the frame at a first end of the lever link, operably coupled to a first actuator at a second end of the lever link opposite the first end, and
 wherein the first transfer link is pivotably coupled to the first lever link at a location spaced a first distance away from the first end of the lever link.

5. The end-of-arm tool of claim 4, wherein the first actuator is a linear actuator comprising a first plunger, and
 wherein the first distance is defined such that a displacement of the first plunger is greater than a longitudinal displacement of the first transfer link to define a first mechanical advantage.

6. The end-of-arm tool of claim 5, wherein the first angle is defined such that the longitudinal displacement of the first transfer link is greater than a displacement of the first jaw in a direction transverse to the longitudinal axis to define a second mechanical advantage.

7. The end-of-arm tool of claim 1, wherein the second jaw is positionable toward the first jaw to further define the gripping configuration of the end-of-arm tool and positionable away from the first jaw to further define the open configuration of the end-of-arm tool; and
 wherein the end-of-arm tool further comprises:
 a second four-bar linkage comprising:
  the frame,
  the second jaw,
  a third jaw link pivotably coupled to the second jaw at a first end of the third jaw link and pivotably coupled to the frame at a second end of the third jaw link opposite the first end, and
  a fourth jaw link pivotably coupled to the second jaw at a first end of the fourth jaw link and pivotably coupled to the frame at a second end of the fourth jaw link opposite the first end, wherein the fourth jaw link extends away from the first jaw at an angle of about 90 degrees with respect to a longitudinal axis of the end-of-arm tool when the end-of-arm tool is disposed in the gripping configuration.

8. The end-of-arm tool of claim 7, wherein the fourth jaw link extends away from the second jaw at the first angle with respect to the longitudinal axis when the end-of-arm tool is disposed in the open configuration.

9. The end-of-arm tool of claim 8, further comprising:
a second transfer link pivotably coupled to the fourth jaw link at a location between the first end and the second end of the fourth jaw link; and
a second lever link,
wherein the second lever link is pivotably coupled to the frame at a first end of the second lever link, operably coupled to the first actuator at a second end of the second lever link opposite the first end, and
wherein the second transfer link is pivotably coupled to the second lever link at a location spaced the first distance away from the first end of second lever link.

10. The end-of-arm tool of claim 1, wherein the first jaw comprises a first face and the second jaw comprises a second face and
wherein a separation distance between the first face and the second face is greater than or equal to a width of a lumber object when the end-of-arm tool is disposed in the gripping configuration.

11. The end-of-arm tool of claim 10, further comprising a first plurality of teeth protruding away from the first face and a second plurality of teeth protruding away from the second face, the first plurality of teeth and the second plurality of teeth configured to (1) penetrate a lumber object when the end-of-arm tool is disposed in the gripping configuration and (2) separate from the lumber object when the end-of-arm tool is disposed in the open configuration.

12. The end-of-arm tool of claim 11, wherein the frame comprises:
a first frame protrusion configured to be disposed through an opening in the first jaw so as to protrude from the first face and extend beyond the first plurality of teeth when the end-of-arm tool is disposed in the open configuration; and
a second frame protrusion configured to be disposed through an opening in the second jaw so as to protrude from the second face and extend beyond the second plurality of teeth when the end-of-arm tool is disposed in the open configuration.

13. The end-of-arm tool of claim 11, wherein at least one of the first jaw link or the second jaw link comprises a first lateral extension adjacent the second end of the at least one of the first jaw link or the second jaw link, the first lateral extension configured to be disposed through an opening in the first jaw so as to protrude from the first face and extend beyond the first plurality of teeth when the end-of-arm tool is disposed in the open configuration; and
wherein at least one of the third jaw link or the fourth jaw link comprises a second lateral extension adjacent the second end of the at least one of the third jaw link or the fourth jaw link, the second lateral extension configured to be disposed through an opening in the second jaw so as to protrude from the second face and extend beyond the second plurality of teeth when the end-of-arm tool is disposed in the open configuration.

14. The end-of-arm tool of claim 1, further comprising a second actuator comprising a second plunger,
wherein actuation of the second actuator displaces the second plunger at least partially between the first jaw and the second jaw.

15. The end-of-arm tool of claim 1, wherein the end-of-arm tool is configured to be coupled to an additional end-of-arm tool in a stacked relationship such that the end-of-arm tool and the additional end-of-arm tool are aligned so as to facilitate gripping of a single lumber object.

16. An end-of-arm tooling assembly, comprising:
a first end-of-arm tool of claim 1; and
a second end-of-arm tool of claim 1,
wherein the first end-of-arm tool and the second end-of-arm tool are coupled together such that the first and second jaws of each of the first end-of-arm tool and the second end-of-arm tool are aligned with each other to facilitate gripping a single lumber object, and
wherein the end-of-arm tooling assembly is configured such that, upon gripping the single lumber object, the first and second jaws of the first end-of-arm tool are positioned at a first location along a length of the single lumber object and the first and second jaws of the second end-of-arm tool are positioned at a second location along the length of the single lumber object, the second location spaced away from the first location.

17. The end-of-arm tooling assembly of claim 16, further comprising a coupling member disposed between the first and second end-of-arm tools, the coupling member comprising an extension member extending distally beyond the first and second end-of-arm tools.

18. The end-of-arm tooling assembly of claim 17, wherein the extension member is configured to establish a predetermined spacing between a gripped lumber object and an adjacent lumber object when the extension member is disposed between the gripped lumber object and the adjacent lumber object.

19. An end-of-arm tool for a robotic arm, comprising:
a frame to be coupled to a robotic arm;
a first jaw coupled to the frame;
a second jaw coupled to the frame, wherein the first jaw and the second jaw are operably coupled to a first actuator, and wherein actuation of the first actuator displaces each of the first jaw and the second jaw toward each other to establish a gripping configuration of the end-of-arm tool and away from each other to establish an open configuration of the end-of-arm tool;
an extractor operably coupled to a second actuator, wherein actuation of the second actuator displaces the extractor at least partially between the first jaw and the second jaw;
a first jaw link comprising a first end and a second end, the first end pivotably coupled to the first jaw and the second end pivotably coupled to the frame; and
a second jaw link comprising a third end and a fourth end, the third end pivotably coupled to the first jaw and the fourth end pivotably coupled to the frame.

20. A method of handling a lumber object, comprising:
providing an end-of-arm tool coupled to a robotic arm, the end-of-arm tool comprising:
opposing jaws operably coupled to a first actuator, wherein actuating the first actuator disposes the opposing jaws in a gripping configuration and an open configuration and;
opposing jaw links, each comprising a first end and a second end, the first end pivotably coupled to the first jaw and the second end pivotably coupled to the frame, wherein actuating the first actuator displaces the opposing jaw links to dispose the opposing jaws in the gripping configuration and the open configuration;

an extractor coupled to a second actuator, wherein actuating the second actuator extends the extractor at least partially between the opposing jaws; positioning the end-of-arm tool in relation to a lumber object such that the opposing jaws are disposed on opposite sides of the lumber object;

disposing the end-of-arm tool in the gripping configuration so as to grip the lumber object;

moving the lumber object from a first location to a second location;

disposing the end-of-arm tool in the open configuration so as to release the lumber object;

extending the extractor between the opposing jaws so as to contact the lumber object and displace the lumber relative to the opposing jaws; and repositioning the end-of-arm tool away from the lumber object.

* * * * *